United States Patent
Baldemair et al.

(10) Patent No.: US 9,769,851 B2
(45) Date of Patent: Sep. 19, 2017

(54) METHODS AND DEVICES FOR TRANSMITTING/RECEIVING DATA BASED ON THE ALLOCATION OF RANDOM ACCESS RESOURCES TO UPLINK SUBFRAMES

(75) Inventors: Robert Baldemair, Solna (SE); David Astely, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 773 days.

(21) Appl. No.: 12/746,899

(22) PCT Filed: Aug. 21, 2008

(86) PCT No.: PCT/SE2008/050941
§ 371 (c)(1),
(2), (4) Date: Jun. 8, 2010

(87) PCT Pub. No.: WO2009/075632
PCT Pub. Date: Jun. 18, 2009

(65) Prior Publication Data
US 2010/0260079 A1    Oct. 14, 2010

Related U.S. Application Data

(60) Provisional application No. 61/013,051, filed on Dec. 12, 2007.

(51) Int. Cl.
*H04W 72/04* (2009.01)
*H04W 74/08* (2009.01)
*H04W 74/00* (2009.01)

(52) U.S. Cl.
CPC ..... *H04W 74/0833* (2013.01); *H04W 74/004* (2013.01)

(58) Field of Classification Search
None
See application file for complete search history.

(56) References Cited

U.S. PATENT DOCUMENTS

| | | | |
|---|---|---|---|
| 2009/0046605 A1* | 2/2009 | Gao | H04W 72/14 370/280 |
| 2009/0109919 A1* | 4/2009 | Bertrand et al. | 370/330 |
| 2010/0172299 A1* | 7/2010 | Fischer et al. | 370/328 |

FOREIGN PATENT DOCUMENTS

| | | |
|---|---|---|
| EP | 1489773 A1 | 12/2004 |
| EP | 1760946 A2 | 3/2007 |
| WO | 2005/109730 A1 | 11/2005 |

(Continued)

OTHER PUBLICATIONS

Motorola. "Proposal for RACH Preambles." TSG-RAN Working Group 1 meeting #6, 3GPP/TSGR 1#6(99)893, Espoo, Finland, Jul. 13-16, 1999, pp. 1-26.

(Continued)

*Primary Examiner* — Christopher Crutchfield
*Assistant Examiner* — Alan Lindenbaum
(74) *Attorney, Agent, or Firm* — Coats & Bennett, PLLC

(57) ABSTRACT

The invention relates to methods and communication devices in a network comprising the steps of mapping (S2) and allocating a first random access resource to a first frequency in an uplink subframe of a radio frame, and transmitting (S4) an expression on the radio channel expressing mapping of the first random access resource to use in relation to at least one uplink subframe.

22 Claims, 9 Drawing Sheets

(56) References Cited

FOREIGN PATENT DOCUMENTS

WO 2007/139188 A1 12/2007
WO 2009/022836 A2 2/2009

OTHER PUBLICATIONS

IPWireless et al., "PRACH Slot Configuration for TDD FS1", 3GPP TSG RAN WG1#50bis, Oct. 8-12, 2007, pp. 1-3, Shanghai, P.R. China, Tdoc R1-074180.
Motorola, "RACH Slot Configurations", 3GPP TSG RAN1#50, Aug. 20-24, 2007, pp. 1-3, Athens, Greece, R1-073403.
Texas Instruments, "Random Access Preamble L1 Parameters in E-UTRA", 3GPP TSG RAN WG1 #49bis, Jun. 25-29, 2007, pp. 1-5, Orlando, US, R1-072838.
Motorola, "RACH Slot Configurations for FS1", 3GPP TSG RAN1#50-bis, Oct. 8-12, 2007, pp. 1-3, Shanghai, China, R1-074027.
3rd Generation Partnership Project. "On Remaining PRACH Issues for TDD." TSG-RAN WG1 #52, R1-080896, Sorrento, Italy, Feb. 11-15, 2008.
3rd Generation Partnership Project. "Joint Signalling of PRACH Configurations and Preamble for TDD." TSG-RAN WG1 #51bis, R1-080351, Sevilla, Spain, Jan. 14-18, 2008.
3rd Generation Partnership Project. Random Access Slot Configurations. 3GPP TSG RAN WG1 #50bis, R1-074144, Shanghai, China, Oct. 8-12, 2007.

\* cited by examiner

METHODS AND DEVICES FOR TRANSMITTING/RECEIVING DATA BASED ON THE ALLOCATION OF RANDOM ACCESS RESOURCES TO UPLINK SUBFRAMES

TECHNICAL FIELD

The present invention relates to methods and devices for transmitting/receiving data. In particular, it relates to transmit/receive data on a radio channel.

BACKGROUND

In modern cellular radio systems, the radio network has a strict control on the behavior of the terminal. Uplink transmission parameters like frequency, timing, and power are regulated via downlink control signaling from the base station to the terminal.

At power-on or after a long standby time, the user equipment (UE) is not synchronized in the uplink. The UE can derive an uplink frequency and power estimate from the downlink (control) signals. However, a timing estimate is difficult to make since the round-trip propagation delay between a base station, eNodeB, and the UE is unknown. So, even if UE uplink timing is synchronized to the downlink, it may arrive too late at the eNodeB receiver because of propagation delays. Therefore, before commencing traffic, the UE has to carry out a Random Access (RA) procedure to the network. After the RA, the eNodeB can estimate the timing misalignment of the UE uplink and send a correction message. During the RA, uplink parameters like timing and power are not very accurate. This poses extra challenges to the dimensioning of a RA procedure.

Usually, a Physical Random Access Channel (PRACH) is provided for the UE to request access to the network. An access burst is used which contains a preamble with a specific sequence with good autocorrelation properties. The PRACH may be orthogonal to the traffic channels. For example, in GSM a special PRACH time slot is defined. Because multiple UEs may request access at the same time, collisions may occur between the requesting UEs. A contention resolution scheme has to be implemented to separate the UE transmissions. The RA scheme usually includes a random back off mechanism. The timing uncertainty is accounted for by extra guard time in the PRACH slot. The power uncertainty is usually less of a problem as the PRACH is orthogonal to the traffic channels.

To distinguish between the different requesting UEs performing RA typically many different RA preambles exist. A UE performing RA picks randomly a preamble out of a pool and transmits it. The preamble represents a random UE ID which is used by an eNodeB when granting the UE access to the network via the eNodeB. The eNodeB receiver can resolve RA attempts performed with different preambles and send a response message to each UE using the corresponding random UE IDs. In case that requesting UEs simultaneously use the same preamble a collision occurs and most likely the RA attempts are not successful since the eNodeB cannot distinguish between the two users.

In E-UTRAN, evolved UMTS Terrestrial Radio Access Network, 64 preambles are provided in each cell. Preambles assigned to adjacent cells are typically different to insure that a RA in one cell does not trigger any RA events in a neighboring cell. Information that must be broadcasted from the base station is therefore the set of preambles that can be used for RA in the current cell.

Since E-UTRAN is capable of operation under very different operation conditions, from femto- and pico-cells up to macro-cells, different requirements are put on RA. Whereas the achievable signal quality for RA is less of a problem in small cells and more challenging in large cells. To also ensure that enough RA preamble energy is received, E-UTRAN defines different preamble formats. Only one such preamble format may be used in a cell and also this parameter must therefore be broadcasted. For Frequency Division Duplex, FDD, four preambles formats are defined.

Yet another parameter that is broadcasted is the exact time-frequency location of an RA resource, also called RA slot or RA opportunity. Such an RA time resource spans always 1.08 MHz in frequency and either 1, 2, or 3 ms in time, depending on the preamble format. For FDD, 16 configurations exist, each defining a different RA time-domain configuration.

In an FDD system, in addition to the signaling required to point out the 64 preambles that can be used in the current cell, another 6 bits are required to indicate preamble format (2 bits) and RA time-domain configuration (4 bits).

Referring to, for example, E-UTRAN time division duplex, TDD, mode, TDD mode has some particularities relative to the FDD mode. These particularities make a simple reuse impossible or impractical including, e.g., that TDD defines in total 5 RA preamble formats and not 4 requiring 3 bits to signal the format. Texas Instrument "Random Access Slot Configurations" XP050107676 discloses RA configurations in FDD.

In FDD the RA time-domain configurations express the first subframe of an RA resource as subframe number within a frame. In an FDD system all subframes located at the UL frequency band are UL subframes at all times and each of them may be—according to the RA time-domain configuration—assigned to RA. In TDD however only a subset of all available subframes are UL subframes and merely those may therefore be allocated to RA. Therefore, the simple counting mechanism based on subframes can not be applied to TDD.

SUMMARY

It is an object of some embodiments to provide an efficient random access signaling. The object is achieved by methods, a user equipment, and a base station according to the claims 1, 7, 13 and 19.

Embodiments disclose a method in a second communication device for transmitting data on a radio channel. The method comprises to map and allocate a first random access resource to a first frequency in a first uplink subframe of a radio frame, and to transmit an expression on the radio channel. The expression expresses allocation of the first random access resource to use in relation to at least one uplink subframe.

In addition, embodiments disclose a second communication device comprising a control unit arranged to map a first random access resource to a first frequency in a first uplink subframe of a radio frame and to create an expression expressing allocation of the first random access resource in relation to at least one uplink subframe. The second communication device further comprises a transmitting arrangement adapted to transmit the expression on a radio channel.

Furthermore, embodiments disclose a method in a first communication device comprising to receive data on a radio channel and to determine a first uplink subframe in a radio frame to use in a random access process by reading an expression in the received data. The expression expresses an allocation of a first random access resource in relation to at least one uplink subframe.

Embodiments also disclose a first communication device comprising a receiving arrangement adapted to receive data on a radio channel. The first communication device further comprises a control unit arranged to determine a first uplink subframe in a radio frame to use in a random access process reading an expression in the received data expressing an allocation of a first random access resource in relation to at least one uplink subframe.

By expressing the random access resource in relation to an uplink subframe an efficient random access configuration signalling is achieved.

BRIEF DESCRIPTION OF THE DRAWINGS

Embodiments will now be described in more detail in relation to the enclosed drawings, in which.

DETAILED DESCRIPTION OF EMBODIMENTS

Figure 1:
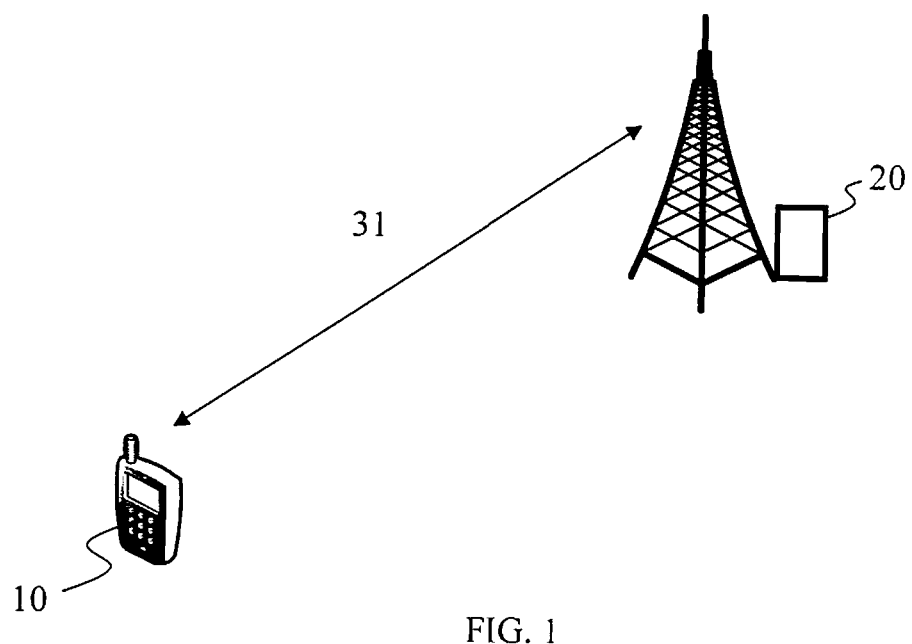
FIG. 1 shows a schematic overview of a first communication device communicating with a second communication device.

Embodiments of the present solution will be described more fully hereinafter with reference to the accompanying drawings, in which embodiments of the solution are shown. This solution may, however, be embodied in many different forms and should not be construed as limited to the embodiments set forth herein. Rather, these embodiments are provided so that this disclosure will be thorough and complete, and will fully convey the scope of the solution to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present solution is described below with reference to block diagrams and/or flowchart illustrations of methods, apparatus (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein a communication device may be a wireless communications device. In the context of the invention, the wireless communication device may e.g. be a node in a network such as a base station or the like, a mobile phone, a PDA (Personal Digital Assistant) or any other type of portable computer such as laptop computer.

The wireless network between the communication devices may be any network such as an IEEE 802.11 type WLAN, a WiMAX, a HiperLAN, a Bluetooth LAN, or a cellular mobile communications network such as a GPRS network, a third generation WCDMA network, or E-UTRAN. Given the rapid development in communications, there will of course also be future type wireless communications networks with which the present invention may be embodied, but the actual design and function of the network is not of primary concern for the solution.

In FIG. 1 a schematic overview of a first communication device 10 communicating with a second communication device 20 is shown. The communication is performed over a first interface 31 such as an air interface or the like. In the illustrated example, the first communication device 10 is a portable unit, such as a mobile phone, a PDA or the like and the second communication device 20 is a base station, such as an eNobeB, NodeB, RBS or the like.

The second communication device 20 sets up and transmits random access, RA, configurations in order for the first communication device 10 to perform a random access process. A random access request from the first communication device 10 may be directed to the second communication device 20 or a different communication device, such as a different base station, during a handover or the like.

RA configurations are expressed not in terms of subframes but in terms of UL subframes and thus tie it to the allocation of subframes to UL and DL. Since a terminal anyway has to know the allocations of subframes to DL and UL no extra signaling is required for this information. An RA configuration maps now to different RA resource allocations depending on the available number of UL subframes: For example, in a very UL heavy allocation the RA resources are preferable spread out over the subframes to decrease processing load in the basestation. However, for DL heavy allocations not enough subframes are available to accommodate the required number of RA resources, here multiple RA resources must be allocated within the same subframe at different frequencies.

Embodiments present systematic ways how to derive the actual mapping from RA resources to UL subframes. RA resources may be spread out as much as possible in time to avoid processing peaks in the eNodeB RA receiver.

In the FDD mode of E-UTRAN, 6 different "densities" of RA opportunities are defined to accommodate the different expected loads on PRACH: 0.5, 1, 2, 3, 5, and 10 RA opportunities within 10 ms independent of the system bandwidth. As a starting point it makes therefore sense to assume these densities for TDD as well. In total there are 5 preamble formats for TDD and for each preamble format up to 6 densities resulting in 30 different combinations. In addition it is desirable to have different "versions" of each combination. For example, for the case with 1 RA opportunity per 10 ms and for preamble format 0 (basic preamble) it is desirable to have 3 different patterns with the same density but where the RA opportunities are allocated at different subframes. This enables an eNodeB that serves multiple cells to use different RA pattern across served cells thus spreading processing load in time.

Thus, three versions multiplied with five preambles multiplied with six densities results in total in ninety combinations that need to be encoded. However, this exceeds the available number of six bits which is used in FDD. Looking more detailed into the different combinations shows that not all combinations actually make sense: Preamble formats 1 and 3 are designed for very large cells where RA load is typically not so high. It is probably for these formats not very important to support the highest densities. Preamble format 3 furthermore requires three subframes which makes it for most common DL/UL splits impossible to support three different versions not overlapping in time. The number of densities and versions could thus be reduced to 3×4=12 for format 1 and 2×2=4 for format 3.

A reasonable set of supported densities for format 1 could be 0.5, 1, 2, and 3 RA opportunities within 10 ms. For format 3 only densities 0.5 and 1 RA opportunities within 10 ms are supported. This results for format 0 to 3 in total 3×6+3×4+3×6+2×2=52 combinations to encode.

With six bits, sixty four combinations may be encoded leaving twelve combinations for format 4. This format 4 is special since it is very short and may only occur in a special field called Uplink Pilot Timeslot, UpPTS. Because of its short duration the link budget of this preamble is inferior compared to other preambles, therefore it is important to have different non-overlapping RA opportunities to create "interference-free" slots. It is important to support three different versions leaving space for four densities for preamble format 4. In total 52+3×4=64 combinations exist. Table 1 summarizes these allocations for the different preambles. The proposed configurations are only examples, it is of course possible to have more combinations for one preamble format and less for another one or trade number of versions vs. number of densities.

TABLE 1

Example of version and density

| Preamble format | RA resources per 10 ms | #Versions |
|---|---|---|
| 0 | 0.5, 1, 2, 3, 5, 10 | 3 |
| 1 | 0.5, 1, 2, 3 | 3 |
| 2 | 0.5, 1, 2, 3, 5, 10 | 3 |
| 3 | 0.5, 1 | 2 |
| 4 | www, xxx, yyy, zzz | 3 |

Another possibility is to generally support at the most five densities and not six when assuming that the $6^{th}$ density (10 RA opportunities in 10 ms) is very high. Using the same arguments as above, the densities and number of versions shown in table 2 are obtained for the different preamble formats. Here is one combination reserved for future use. Also this set of combinations is only examples and different tradeoffs between preamble formats and densities vs. versions can also be made here.

TABLE 2

Another example of version and density allocation
for different preamble formats

| Preamble format | RA resources per 10 ms | #Versions |
|---|---|---|
| 0 | 0.5, 1, 2, 3, 5 | 3 |
| 1 | 0.5, 1, 2, 3 | 3 |
| 2 | 0.5, 1, 2, 3, 5 | 3 |
| 3 | 0.5, 1 | 3 |
| 4 | 5 different densities | 3 |

In the following a combination of preamble format, density, and version is referred to as extended RA configuration.

Depending on the DL/UL allocation the different RA configurations have different interpretations. In order to reduce the required signaling it is therefore proposed to number the subframes allocated to RA in terms of UL subframes rather than subframes.

One possibility may be to define for each extended RA configuration and each possible DL/UL allocation a pattern describing the UL subframes and frequency region allocated to RA. In addition to DL/UL split the system bandwidth also has an impact since for lower system bandwidth less frequency regions are available than for higher bandwidth.

Figure 2:
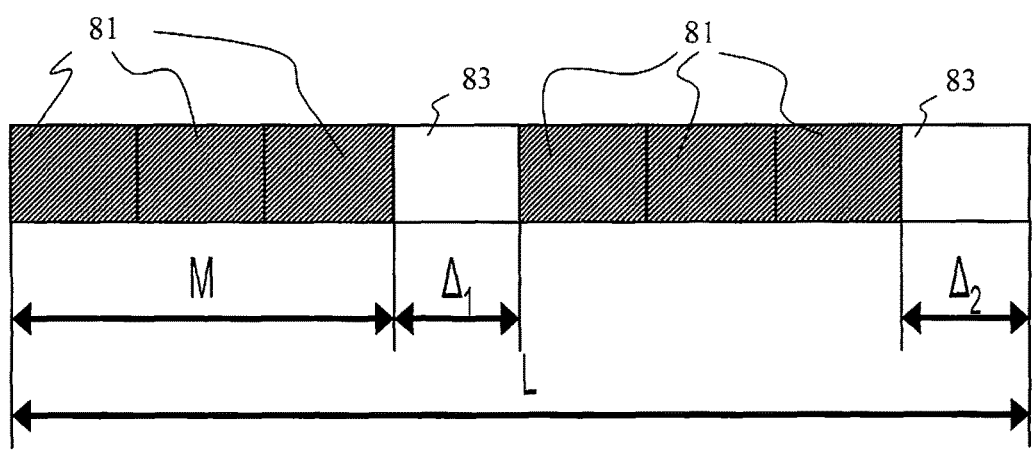
FIG. 2 shows a schematic overview of UL subframes within the duration of one RA period.

A more systematic approach is described in the following:
In FIG. 2 all UL subframes within the duration of one RA period are shown. RA subframes are denoted 81 and non RA subframes are denoted as 83. The RA period is 10 ms for RA densities larger or equal to 1 per 10 ms and 20 ms for 0.5 RA opportunities per 10 ms. The number of UL subframes within the RA period is denoted L. The number of subframes allocated to each RA resource is M. N is then the number of RA resources that can be placed non-overlapping in each RA period. The considered extended RA configuration has a density of D RA opportunities within the RA period. The gaps $\Delta_1$ and $\Delta_2$ are the numbers of UL subframes between two consecutive RA resources and the number of RA subframes left after the last RA subframe, respectively. R denotes the number of different versions that exist of the given extended RA configuration.

$$N = \min\left(\left\lfloor \frac{L}{M} \right\rfloor, R \cdot D\right)$$

$$\Delta_1 = \left\lfloor \frac{L - N \cdot M}{N} \right\rfloor$$

$$\Delta_2 = L - N \cdot M - (N-1) \cdot \Delta_1$$

The number $t_{l,k}$ to be the UL subframe number where RA opportunity k of version/of the given extended RA configuration starts. Here is assumed that the numbering of UL subframes and versions start with 0. If not enough versions may be placed non-overlapping into one RA period the placement starts over starting from UL subframe 0 at another frequency. Further, the number $f_{l,k}$ denotes the logical index to the predefined frequency at which RA opportunity k of version l is located at (logical index since the predefined frequencies neither have to be contiguous nor assigned to monotonic increasing/decreasing frequencies). Since in total only $N_{RA/BW}$ predefined RA frequency regions exist a modulo operations is required to constrain the allocated frequency band to those predefined frequencies. For smaller system bandwidth not enough RA frequency bands $N_{RA/BW}$ may exist and placement of different RA resources overlap.

$$t_{k,l} = (k \cdot D + l \bmod N) \cdot (M + \Delta_1)$$

$$t_{k,l} = \left\lfloor \frac{k \cdot D + l}{N} \right\rfloor \bmod N_{RA/BW}$$

Figure 3:
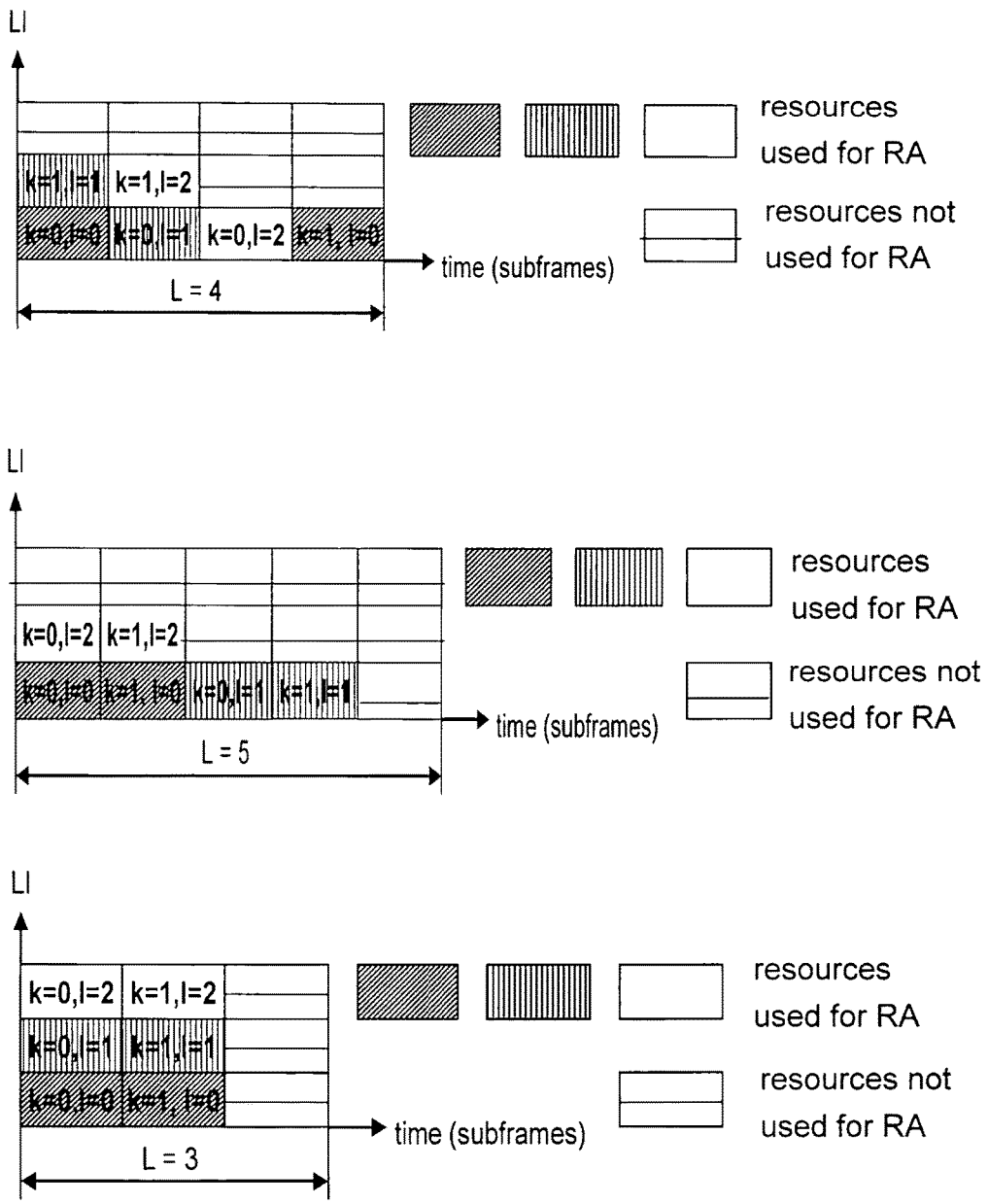
FIG. 3 shows a schematic overview of examples how RA resources are mapped to uplink subframes.

FIG. 3 shows different examples of extended RA configurations and their actual mapping to UL subframes.

In the top figure the RA opportunity 0 of version 0 is firstly allocated followed by opportunity 0 of versions 1 and 2, that is, l=1 and 2. RA opportunity 1 of version 0 is then allocated along the time domain and RA opportunity 1 of versions 1 and 2 are allocated in a different frequency.

In the middle figure, the RA opportunity 0, version 0 is followed by RA opportunity 0 of versions 1. RA opportunity 0 of version 2 is then frequency multiplexed into the same UL subframes as RA opportunity 0 of version 0. Here one RA opportunity consists of 2 UL subframes.

In the lower figure, each version is allocated at different frequencies.

The simplest way to define the predefined RA frequency regions is to extend the concept from FDD where these regions are placed at the band edges of the uplink shared channel. If multiple RA resources are distributed over time within a RA period (i.e. N>1) the position of these frequency regions may hop according to a predefined hopping pattern. In the simplest case the only allowed hopping positions are at the two band edges of the uplink shared channel.

Figure 4:
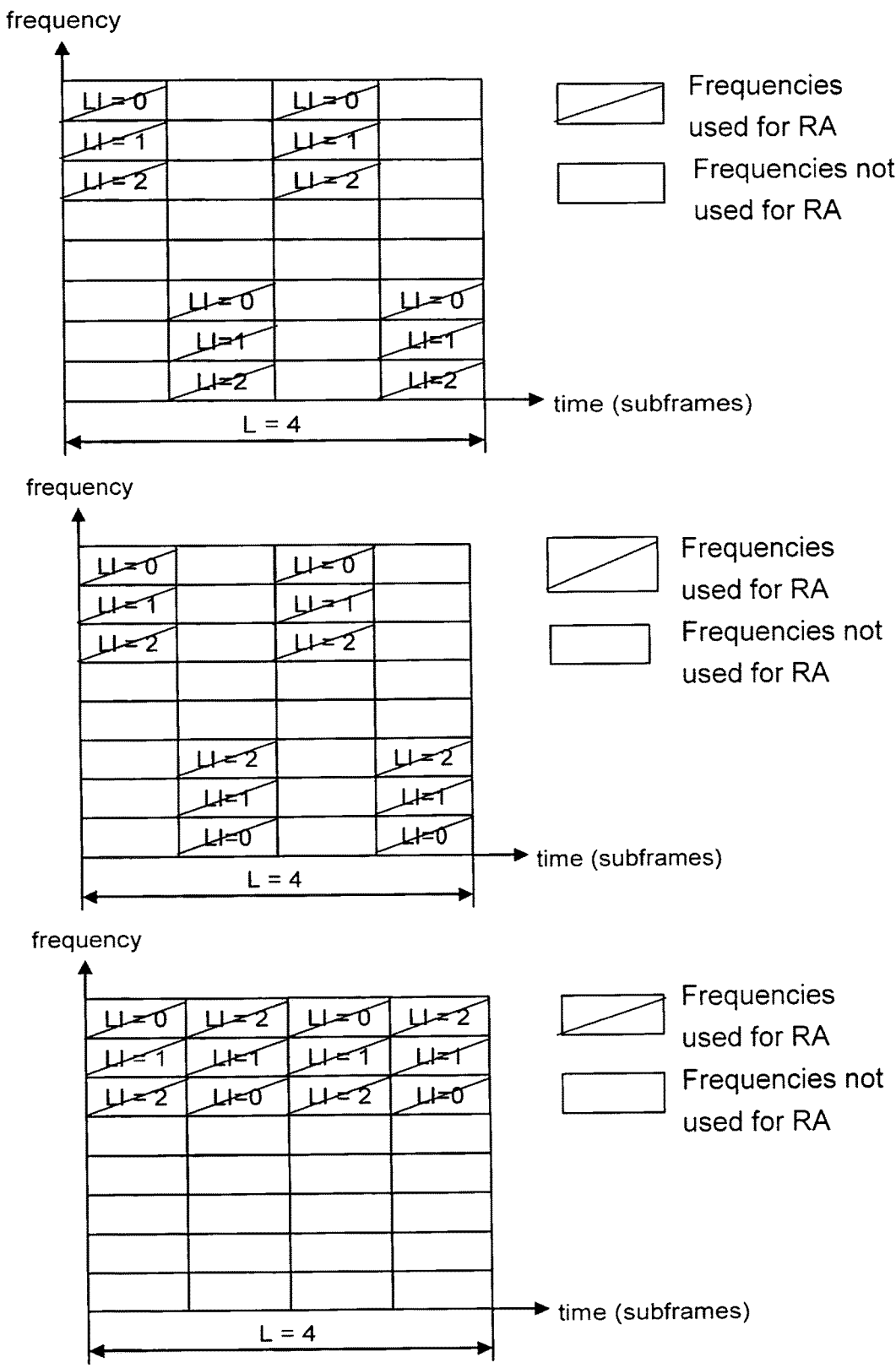
FIG. 4 shows a schematic overview of a mapping between logical and physical frequencies when using frequency hopping.

In FIG. 4, it is shown how a logical index—LI—is mapped to physical frequencies. The logical index is given by the formula above wherein $f_{l,k}$ denotes the logical index to the predefined frequency at which RA opportunity k of version l is located at.

The described way is an example how to calculate the exact mapping of UL subframes to RA subframes. Important is 1) to try to spread out opportunities in time and 2) (if not enough UL subframes are available to separate all opportunities of a version in time) to place multiple RA subframe into the same UL subframe(s) at different frequencies.

Even though above explanations were done in the context of a TDD system the same ideas are also applicable to a half-duplex FDD system.

Figure 5:
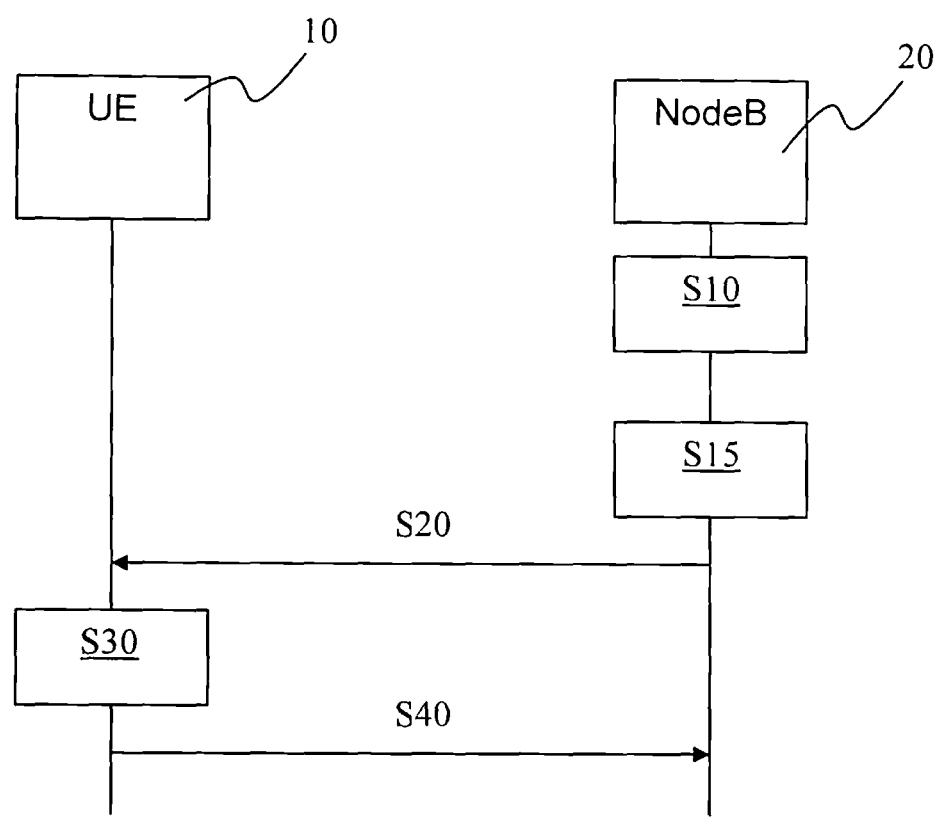
FIG. 5 shows a combined signaling and method diagram of a random access procedure.

In FIG. 5, a schematic overview of a signaling diagram is shown. The signaling scheme is between a first communication device 10, such as a user equipment UE or the like, and a second communication device 20, such as a NodeB or the like.

In step S10, the NodeB 20 maps a random access resource to an uplink subframe. By expressing the random access resource relative to the uplink subframes the amount of data that needs to be transmitted is reduced. For example, four subframes are uplink subframes out of ten subframes. This means, that random access resource may only be out of these uplink subframes and the random access resource is expressed as a number out of these four uplink subframes. Hence, the NodeB 20 creates an expression expressing the random access resource in relation to the uplink subframes and simplifies the description of RA configuration by using uplink subframes.

It should be understood that a plurality of random access resources may be allocated to a plurality of uplink subframes and also that one random access resource may be allocated to a number of uplink subframes.

In optional step S15, the NodeB allocates, when allocating a plurality of random access resources to a plurality of uplink subframes, the random access resources first in time and then in the frequency domain in order to optimize processing capacity. For example, if an RA configuration requires an amount of six random access resources and the subframe configuration comprises four uplink subframes, four random access resources are used at a first frequency and two random access resources are used at a second frequency. This results in that less hardware is required during peak processing and the like.

In step S20, the NodeB 20 transmits the expression to the UE over a radio channel, such as a broadcast channel or the like.

In step S30, the UE receives the expression and reads out the RA configuration stating certain uplink subframes to use for random access resource. For example, if a second uplink subframe, corresponding to a fifth subframe within a frame, is to be used, the UE reads out that the second uplink subframe is to be used and uses the fifth subframe during a random access procedure.

In step S40, the UE transmits a random access sequence using the uplink subframe to access a network. The UE may transmit the sequence to the NodeB 20 or, for example, in a handover of the UE, the UE may transmit the sequence to a different NodeB.

Figure 6:
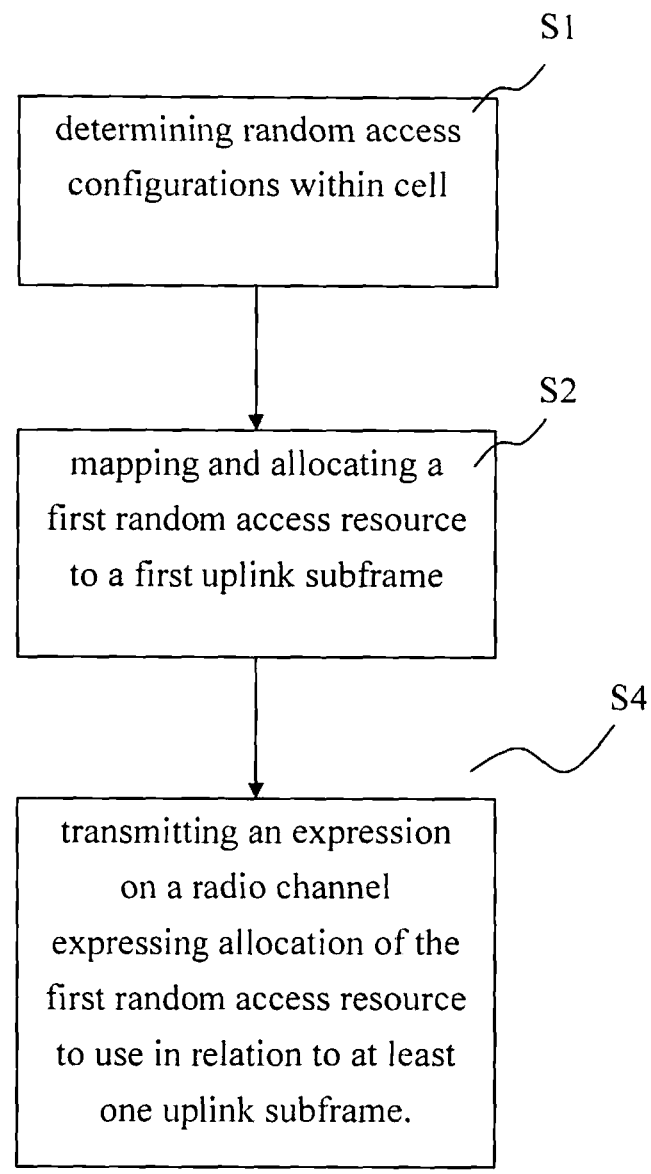
FIG. 6 shows a flow chart of a method in a second communication device.

In FIG. 6, a schematic flow chart of a method in a second communication device is shown. The second communication device may be a radio base station, eNodeB, NodeB, a combined base station and base station controller or the like.

In optional step S1, the second communication device performs an analysis of a cell of the second communication device and determines random access configurations, such as random access resources, length of preambles and the like, number of uplink subframes and the like.

In step S2, the second communication device maps and allocates a first random access resource to a first or multiple uplink subframes or a number of random access resources to a number of uplink subframes. The second communication device then creates an expression expressing allocation of the first random access resource to use in relation to at least one uplink subframe. In some embodiments, a first uplink subframe of the first random access resource to use is expressed as an ordinal number of uplink subframes. For example, a first random access resource is expressed as being allocated to the third uplink subframe.

In some embodiments, the first random access resource/s extends over a plurality of uplink subframes and the expression merely expresses the first uplink subframe to use. In some alternative embodiments at least one additional uplink subframe of random access resource/s to use is expressed as an ordinal number of uplink subframes. That is, at least two uplink subframes to use are pointed out.

The mapping step may further comprise to map a plurality of random access resources to a plurality of uplink subframes and wherein the plurality of random access resources is allocated by first spreading out the plurality of random access resources over the plurality of uplink subframes in time first.

It should be understood that the random access resources may be allocated to the uplink subframes in time first and then in frequency if and only if the number of UL subframes is not sufficient to hold all random access resources. In some embodiments, at least one random access resource of the plurality of random access resources to use is allocated, when not enough uplink subframes are available in time to map all the plurality of random access resources to uplink subframes, into a different frequency of at least one uplink subframe.

The at least one uplink subframe used at the different frequency is the uplink subframe corresponding to the uplink subframe allocated to the first random access resource used at the first frequency.

Within one radio frame we have multiple RA opportunities according to the RA density. Each RA opportunity consists of a number of subframes, for example, 1, 2, or 3 subframes, depending on the preamble format. Hence, the random access opportunities for each PRACH configuration may be allocated in time first and then in frequency if and only if time multiplexing is not sufficient to hold all opportunities of a PRACH configuration needed for a certain density value without overlap in time.

In step S4, the second communication device transmits the expression on a radio channel within the cell. The radio channel may be a broadcast channel or the like.

In order to perform the method steps a second communication device is provided.

Figure 7:
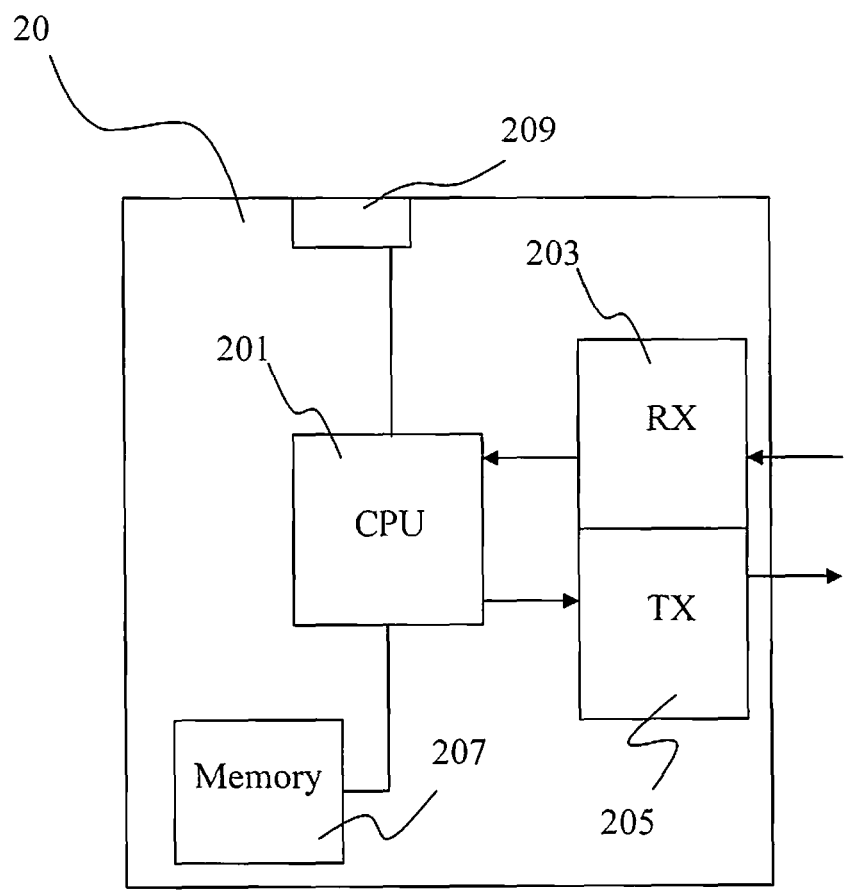
FIG. 7 shows a schematic overview of a second communication device.

In FIG. 7 a schematic overview of a second communication device 20 is shown.

The second communication device 20 comprises a control unit 201, such as a μ processor, a plurality of processors or the like, arranged to map and allocate a first random access resource to a first uplink subframe of a radio frame, based on RA configuration, DL/UL split, system bandwidth and/or the like. This mapping of the random access resource to the uplink subframe is then expressed in an expression, for example, data packets or the like, wherein the random access resource is expressed in relation to the present uplink subframe/s. Hence, the control unit 201 creates an expression data packet expressing allocation of the random access resources to use in relation to at least one uplink subframe. In some embodiments, a first uplink subframe of a random access resource to use is expressed as an ordinal number of uplink subframes.

For example, a first uplink subframe to use as a first random access resources is expressed as being the second uplink subframe. In some embodiments, the expression merely contains this ordinal number, $2^{nd}$ UL subframe, even if the resource extends over a plurality of uplink subframes or a plurality of random access resources are mapped to a plurality of uplink subframes. In some alternative embodiments, at least one additional uplink subframe of a random access resource/s to use is expressed as an ordinal number of uplink subframes. For example, RA resources are expressed as being the second and the third uplink subframe.

Furthermore, the control unit 201 may be arranged to allocate random access resources that extend over a plurality of uplink subframes in time first and may allocate random access resources at different frequencies when not enough uplink subframes are available in time.

In some embodiments, the control unit 201 is arranged to map a plurality of random access resources to use to a plurality of uplink subframes and wherein the plurality of random access resources is allocated by first spreading out the plurality of random access resources over the plurality of uplink subframes in time first. The control unit 201 may further be arranged to allocate at least one random access resource of the plurality of random access resources to use into a different frequency of at least one uplink subframe when not enough uplink subframes are available in time. The at least one uplink subframe used at the different frequency is the uplink subframe corresponding to the uplink subframe allocated to the first random access resource used at the first frequency.

The control unit 201 may further be arranged to determine cell related parameters, such as, random access configurations, number of uplink subframes or the like. These may also be inputted manually or the like.

The second communication device 20 further comprises a transmitting arrangement 205 adapted to transmit the expression over a radio channel within the cell of the second communication device 20, such as a broadcast channel or the like. The expression comprises a data packet indicating the relation of the allocated random access resources to the uplink subframes, for example, as an ordinal number of uplink subframes.

As the second communication device already has informed the first communication device which subframes are downlink and which are uplink subframes this signaling is very efficient.

The second communication device 20 may further comprise a receiving arrangement 203 adapted to receive data from different communication devices, for example, a first communication device using the random access resource when performing a random access process.

In the illustrated example, the second communication device 20 comprises a memory unit 207 arranged to have application/s installed thereon that when executed on the control unit 201 makes the control unit 201 perform the steps of the method. Furthermore, the memory unit 207 may have data stored, such as, random access related data or the like, thereon. The memory unit 207 may be a single unit or a number of memory units.

Furthermore, the second communication device 20 may comprise an interface 209 for communicating with a network.

Figure 8:
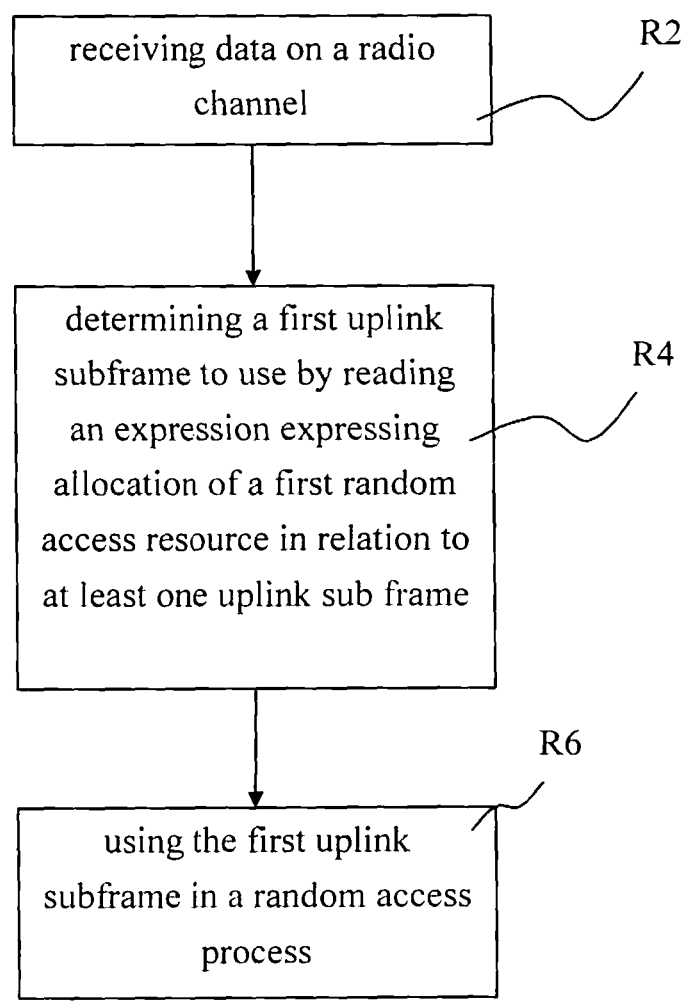
FIG. 8 shows a flow chart of a method in a first communication device.

In FIG. 8, a schematic overview of a flow chart of a method in a first communication device is shown.

In step R2, the first communication device receives data on a radio channel from a second communication device. The radio channel may be a broadcast channel or the like.

In step R4, the first communication device determines a first uplink subframe in a radio frame to use in a random access process by reading an expression in the received data. The data comprises an expression expressing allocation of a first random access resource to use in relation to at least one uplink subframe. In some embodiments, the first uplink subframe of a random access resource to use may be expressed in the expression as an ordinal number of uplink subframes.

In some embodiments, the random access configuration comprises a plurality of random access resources and the plurality of random access resources is allocated by first spreading out the random access resources over uplink subframes in time.

Furthermore, at least one random access resource of the plurality of random access resources may be allocated, when not enough uplink subframes are available in time to map all the plurality random access resources to uplink subframes, into a different frequency of at least one uplink subframe. The at least one uplink subframe used at the different frequency is in some embodiments an uplink subframe corresponding to the uplink subframe allocated to the first random access resource.

In optional step R6, the first communication device performs a random access process using the first uplink subframe as a random access resource.

In order to perform the method procedure a first communication device is provided. The first communication device may be a user equipment, such as a mobile phone, a PDA, a wireless laptop or the like.

Figure 9:
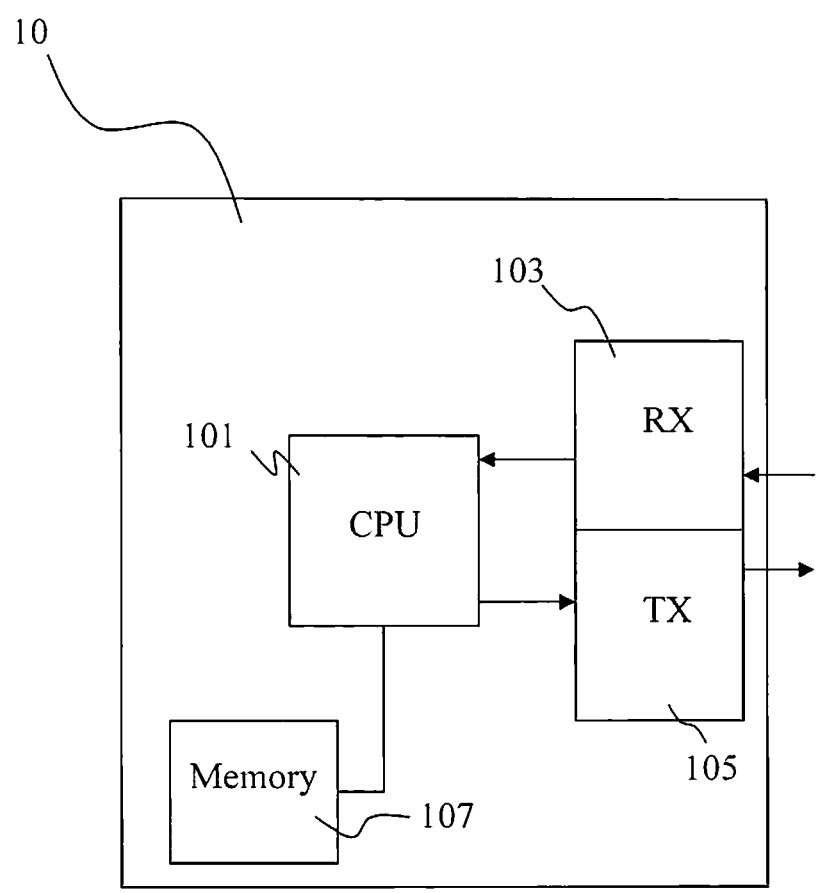
FIG. 9 shows a schematic overview of a first communication device.

In FIG. 9, a schematic overview of a first communication device 10 is shown.

The first communication device 10 comprises a receiving arrangement 103 adapted to receive data, such as data over a radio channel from a second communication device, such as a broadcast channel or the like, and a control unit 101 arranged to decode and read the received data. The control unit 101 is arranged to determine which uplink subframe/s to use as a random access resource/s based on an expression received in the data. The expression expresses the allocation of the random access resource/s in relation to the allocated uplink subframes. Hence, by reading the expression, for example, that RA resource is uplink subframe nr 1, and the control unit 101 knows that the first uplink subframe is the fifth subframe, the control unit 101 determines that the fifth subframe is to be used as a random access resource.

It should be noted that in some embodiments merely the beginning of the RA resource is expressed by a first UL subframe number and in some other embodiments subsequent RA resources of a random access configuration are expressed as well in relation to the uplink subframes.

The control unit 101 may additionally be arranged to perform a random access process in order to access a network. In the random access process the control unit 101 uses the determined RA resource according to the expression and transmits the connection request using a transmitting arrangement 105.

The first communication device 10 may, in some embodiments, further contain a memory arrangement 107, comprising a single memory unit or a number of memory units. Application/s arranged to be executed on the control unit to perform the method steps may be stored on the memory as well as RA configurations data such as random access resources and the like.

It should be understood that the receiving and transmitting arrangements in the communication devices may be separated devices or a combined device, such as a transceiving unit or the like.

It should also be noted that the random access resources to use may be allocated by first spreading out the random access resources over uplink subframes in time.

The random access resources to use may be allocated, when not enough uplink subframes are available in time, into the same uplink subframe as another RA resource at a different frequency.

Consequently, the control unit 101 may be arranged, when a plurality of random access resources exist in a radio frame, to spread out the plurality of random access resources over uplink subframes in time first. It should be understood that at least one of a plurality of random access resources is allocated, when not enough uplink subframes are available in time to hold all of the plurality of random access resources, into a different frequency of an uplink subframe.

In some embodiments, the uplink subframe of the different frequency is corresponding to the first uplink subframe.

Making the interpretation of the RA configurations DL/UL split and bandwidth depended dramatically reduces signaling since the huge amount of DL/UL split and bandwidth combinations would require a vast amount of signaling.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method performed by a user equipment configured for use in a wireless communication system, the method comprising:
receiving signaling indicating one of multiple predefined uplink-downlink configurations that configure a radio frame differently in terms of which one or more subframes of the radio frame are uplink subframes and which one or more subframes of the radio frame are downlink subframes, wherein the subframes of a radio frame are respectively indexed by subframe numbers that indicate the order in which the subframes occur irrespective of whether the subframes are uplink or downlink subframes;
receiving signaling indicating one of multiple predefined random access configurations;
mapping the indicated uplink-downlink configuration and the indicated random access configuration to a resource allocation that defines an allocation of one or more random access resources in time and frequency, using one of multiple different resource mappings that map different combinations of random access configurations and uplink-downlink configurations to respective predefined resource allocations, wherein each resource mapping indicates with a specific uplink subframe number the location in time to which a predefined resource allocation allocates a specific random access resource for a combination that includes a given uplink-downlink configuration, wherein one or more uplink subframes are respectively indexed by one or more uplink subframe numbers that indicate the order in which the one or more uplink subframes occur according to the given uplink-downlink configuration, wherein the specific uplink subframe number indexes a specific one of the one or more uplink subframes and differs from a subframe number that also indexes the specific one of the one or more uplink subframes; and
performing random access during a given random access period using the one or more random access resources.

2. The method of claim 1:
wherein at least one predefined resource allocation that is defined for a given uplink-downlink configuration, and that allocates more random access resources than the number of uplink subframes configured by the given uplink-downlink configuration, allocates random access resources using both time division multiplexing and frequency division multiplexing; and
wherein at least one predefined resource allocation that is defined for a given uplink-downlink configuration, and that does not allocate more random access resources than the number of uplink subframes configured by the given uplink-downlink configuration, allocates random access resources using time division multiplexing but not frequency division multiplexing.

3. The method of claim 1, wherein, for at least one predefined resource allocation defined for a given uplink-downlink configuration, the time-frequency location of one or more random access resources allocated by that predefined resource allocation depends on how many uplink subframes are configured by the given uplink-downlink configuration.

4. The method of claim 1, wherein the wireless communication system is a time division duplex (TDD) system.

5. The method of claim 1, wherein the wireless communication system includes an evolved UMTS Terrestrial Radio Access Network (E-UTRAN).

6. The method of claim 1, wherein said mapping comprises identifying which one of the different resource mappings is defined for the indicated uplink-downlink configuration and the indicated random access configuration, and determining, based on the indicated uplink-downlink configuration, the subframe number that indexes the same subframe as the specific uplink subframe number with which the identified resource mapping indicates the location in time to which a specific random access resource is allocated.

7. A user equipment configured for use in a wireless communication system, the user equipment comprising:
processing circuitry and a memory, the memory containing instructions executable by the processing circuitry whereby the user equipment is configured to:
receive signaling indicating one of multiple predefined uplink-downlink configurations that configure a radio frame differently in terms of which one or more subframes of the radio frame are uplink subframes and which one or more subframes of the radio frame are downlink subframes, wherein the subframes of a radio frame are respectively indexed by subframe numbers that indicate the order in which the subframes occur irrespective of whether the subframes are uplink or downlink subframes;
receive signaling indicating one of multiple predefined random access configurations;
map the indicated uplink-downlink configuration and the indicated random access configuration to a resource allocation that defines an allocation of one or more random access resources in time and frequency, using one of multiple different resource mappings that map different combinations of random access configurations and uplink-downlink configurations to respective predefined resource allocations, wherein each resource mapping indicates with a specific uplink subframe number the location in time to which a predefined resource allocation allocates a specific random access resource for a combination that includes a given uplink-downlink configuration, wherein one or more uplink subframes are respectively indexed by one or more uplink subframe numbers that indicate the order in which the one or more uplink subframes occur according to the given uplink-downlink configuration, wherein the specific uplink subframe number indexes a specific one of the one or more uplink subframes and differs from a subframe number that also indexes the specific one of the one or more uplink subframes;
perform random access during a given random access period using the one or more random access resources.

8. The user equipment of claim 7:
wherein at least one predefined resource allocation that is defined for a given uplink-downlink configuration, and that allocates more random access resources than the number of uplink subframes configured by the given uplink-downlink configuration, allocates random access resources using both time division multiplexing and frequency division multiplexing; and
wherein at least one predefined resource allocation that is defined for a given uplink-downlink configuration, and that does not allocate more random access resources than the number of uplink subframes configured by the given uplink-downlink configuration, allocates random access resources using time division multiplexing but not frequency division multiplexing.

9. The user equipment of claim 7, wherein, for at least one predefined resource allocation defined for a given uplink-downlink configuration, the time-frequency location of one or more random access resources allocated by that predefined resource allocation depends on how many uplink subframes are configured by the given uplink-downlink configuration.

10. The user equipment of claim 7, wherein the wireless communication system is a time division duplex (TDD) system.

11. The user equipment of claim 7, wherein the wireless communication system includes an evolved UMTS Terrestrial Radio Access Network (E-UTRAN).

12. The user equipment of claim 7, wherein the memory contains instructions executable by the processing circuitry whereby the user equipment is configured to identify which one of the different resource mappings is defined for the indicated uplink-downlink configuration and the indicated random access configuration, and determine, based on the indicated uplink-downlink configuration, the subframe number that indexes the same subframe as the specific uplink subframe number with which the identified resource mapping indicates the location in time to which a specific random access resource is allocated.

13. A method performed by a base station configured for use in a wireless communication system, the method comprising:
   transmitting signaling indicating one of multiple predefined uplink-downlink configurations that configure a radio frame differently in terms of which one or more subframes of the radio frame are uplink subframes and which one or more subframes of the radio frame are downlink subframes, wherein the subframes of a radio frame are respectively indexed by subframe numbers that indicate the order in which the subframes occur irrespective of whether the subframes are uplink or downlink subframes;
   transmitting signaling indicating one of multiple predefined random access configurations;
   allocating one or more random access resources in time and frequency as defined by a specific one of multiple predefined resource allocations, wherein multiple different resource mappings map different combinations of random access configurations and uplink-downlink configurations to respective ones of the multiple predefined resource allocations, wherein each resource mapping indicates with an uplink subframe number the location in time to which a predefined resource allocation allocates a specific random access resource for a combination that includes a given uplink-downlink configuration, wherein one or more uplink subframes are respectively indexed by one or more uplink subframe numbers that indicate the order in which the one or more uplink subframes occur according to the given uplink-downlink configuration, wherein the specific uplink subframe number indexes a specific one of the one or more uplink subframes and differs from a subframe number that also indexes the specific one of the one or more uplink subframes; and
   receiving random access signaling during a given random access period on the one or more allocated random access resources.

14. The method of claim 13:
   wherein at least one predefined resource allocation that is defined for a given uplink-downlink configuration, and that allocates more random access resources than the number of uplink subframes configured by the given uplink-downlink configuration, allocates random access resources using both time division multiplexing and frequency division multiplexing; and
   wherein at least one predefined resource allocation that is defined for a given uplink-downlink configuration, and that does not allocate more random access resources than the number of uplink subframes configured by the given uplink-downlink configuration, allocates random access resources using time division multiplexing but not frequency division multiplexing.

15. The method of claim 13, wherein, for at least one predefined resource allocation defined for a given uplink-downlink configuration, the time-frequency location of one or more random access resources allocated by that predefined resource allocation depends on how many uplink subframes are configured by the given uplink-downlink configuration.

16. The method of claim 13, wherein the wireless communication system is a time division duplex (TDD) system.

17. The method of claim 13, wherein the wireless communication system includes an evolved UMTS Terrestrial Radio Access Network (E-UTRAN).

18. A base station configured for use in a wireless communication system, the base station comprising:
   processing circuitry and a memory, the memory containing instructions executable by the processing circuitry whereby the base station is configured to:
      transmit signaling indicating one of multiple predefined uplink-downlink configurations that configure a radio frame differently in terms of which one or more subframes of the radio frame are uplink subframes and which one or more subframes of the radio frame are downlink subframes, wherein the subframes of a radio frame are respectively indexed by subframe numbers that indicate the order in which the subframes occur irrespective of whether the subframes are uplink or downlink subframes;
      transmit signaling indicating one of multiple predefined random access configurations;
      allocate one or more random access resources in time and frequency as defined by a specific one of multiple predefined resource allocations, wherein multiple different resource mappings map different combinations of random access configurations and uplink-downlink configurations to respective ones of the multiple predefined resource allocations, wherein each resource mapping indicates with an uplink subframe number the location in time to which a predefined resource allocation allocates a specific random access resource for a combination that includes a given uplink-downlink configuration, wherein one or more uplink subframes are respectively indexed by one or more uplink subframe numbers that indicate the order in which the one or more uplink subframes occur according to the given uplink-downlink configuration, wherein the specific uplink subframe number indexes a specific one of the one or more uplink subframes and differs from a subframe number that also indexes the specific one of the one or more uplink subframes; and receive random access signaling during a given random access period on the one or more allocated random access resources.

19. The base station of claim 18:
wherein at least one predefined resource allocation that is defined for a given uplink-downlink configuration, and that allocates more random access resources than the number of uplink subframes configured by the given uplink-downlink configuration, allocates random access resources using both time division multiplexing and frequency division multiplexing; and
wherein at least one predefined resource allocation that is defined for a given uplink-downlink configuration, and that does not allocate more random access resources than the number of uplink subframes configured by the given uplink-downlink configuration, allocates random access resources using time division multiplexing but not frequency division multiplexing.

20. The base station of claim 18, wherein, for at least one predefined resource allocation defined for a given uplink-downlink configuration, the time-frequency location of one or more random access resources allocated by that predefined resource allocation depends on how many uplink subframes are configured by the given uplink-downlink configuration.

21. The base station of claim 18, wherein the wireless communication system is a time division duplex (TDD) system.

22. The base station of claim 18, wherein the wireless communication system includes an evolved UMTS Terrestrial Radio Access Network (E-UTRAN).

* * * * *

UNITED STATES PATENT AND TRADEMARK OFFICE
CERTIFICATE OF CORRECTION

PATENT NO. : 9,769,851 B2
APPLICATION NO. : 12/746899
DATED : September 19, 2017
INVENTOR(S) : Baldemair et al.

It is certified that error appears in the above-identified patent and that said Letters Patent is hereby corrected as shown below:

On the Title Page

On Page 2, in Item (56), under "OTHER PUBLICATIONS", in Column 1, Line 17, delete "Sevilla," and insert -- Seville, --, therefor.

In the Specification

In Column 3, Lines 58-59, delete ""comprises" "comprising,"" and insert -- "comprises", "comprising," --, therefor.

In Column 5, Line 22, delete "FIG. 1" and insert -- FIG. 1, --, therefor.

In Column 5, Line 30, delete "eNobeB," and insert -- eNodeB, --, therefor.

In Column 5, Line 48, delete "basestation." and insert -- base station. --, therefor.

In Column 7, Line 28, delete "FIG. 2" and insert -- FIG. 2, --, therefor.

In Column 7, Line 53, delete "version/of" and insert -- version 1 of --, therefor.

In Column 8, Lines 1-5, delete "
$$t_{k,l} = (k \cdot D + l \bmod N) \cdot (M + \Delta_1)$$
$$t_{k,l} = \left\lfloor \frac{k \cdot D + l}{N} \right\rfloor \bmod N_{RA/BW}$$
" and insert --
$$t_{k,l} = (k \cdot D + l \bmod N) \cdot (M + \Delta_1)$$
$$f_{k,l} = \left\lfloor \frac{k \cdot D + l}{N} \right\rfloor \bmod N_{RA/BW}$$
--, therefor.

In Column 8, Line 46, delete "user equipment UE" and insert -- user equipment (UE) --, therefor.

Signed and Sealed this
Twentieth Day of February, 2018

Andrei Iancu
*Director of the United States Patent and Trademark Office*

CERTIFICATE OF CORRECTION (continued)
U.S. Pat. No. 9,769,851 B2

In Column 10, Line 19, delete "FIG. 7" and insert -- FIG. 7, --, therefor.

In the Claims

In Column 14, Line 53, in Claim 7, delete "subframes;" and insert -- subframes; and --, therefor.